(12) United States Patent
Nierlich et al.

(10) Patent No.: US 9,148,023 B2
(45) Date of Patent: Sep. 29, 2015

(54) CONTROL NETWORK FOR SINGLE- OR MULTI-MOTOR ACTUATORS, THE NETWORK BEING PARTICULARLY ADAPTED TO AVIATION APPLICATIONS SUCH AS POWERING THE MOTORS OF LANDING-GEAR HOOK UNITS

(75) Inventors: Florent Nierlich, Lagarenne-Colombes (FR); Etienne Annee, Courbevoie (FR); Francois-Noel Leynaert, Montmorency (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 420 days.

(21) Appl. No.: 12/901,006

(22) Filed: Oct. 8, 2010

(65) Prior Publication Data
US 2011/0084550 A1   Apr. 14, 2011

(30) Foreign Application Priority Data
Oct. 13, 2009  (FR) ..................... 09 04895

(51) Int. Cl.
| | |
|---|---|
| B60L 1/00 | (2006.01) |
| B60L 3/00 | (2006.01) |
| H02G 3/00 | (2006.01) |
| H02J 4/00 | (2006.01) |
| B64C 25/30 | (2006.01) |
| B64C 25/44 | (2006.01) |
| H02J 9/00 | (2006.01) |

(52) U.S. Cl.
CPC . *H02J 4/00* (2013.01); *B64C 25/30* (2013.01); *B64C 25/44* (2013.01); *H02J 9/00* (2013.01); *B60T 2270/414* (2013.01); *B64D 2221/00* (2013.01)

(58) Field of Classification Search
USPC .......................................... 307/9.1, 25, 26, 64
See application file for complete search history.

(56) References Cited

U.S. PATENT DOCUMENTS

| | | | |
|---|---|---|---|
| 4,645,940 A | 2/1987 | Wertheim | |
| 4,927,329 A * | 5/1990 | Kliman et al. | ................ 416/127 |
| 5,182,463 A * | 1/1993 | Yamamoto et al. | ............. 307/46 |
| 5,210,685 A * | 5/1993 | Rosa | ............................. 363/109 |
| 5,670,856 A | 9/1997 | Le et al. | |
| 6,278,262 B1 * | 8/2001 | Ullyott | ............................. 322/22 |
| 6,351,090 B1 * | 2/2002 | Boyer et al. | .................. 318/139 |
| 6,806,589 B1 * | 10/2004 | Suttie | ............................... 307/73 |
| 7,239,044 B1 * | 7/2007 | Atcitty et al. | ................... 307/66 |
| 7,482,709 B2 | 1/2009 | Berenger | |
| 2010/0012779 A1 * | 1/2010 | Collins | ..................... 244/102 R |

* cited by examiner

*Primary Examiner* — Rexford Barnie
*Assistant Examiner* — Rasem Mourad
(74) *Attorney, Agent, or Firm* — Sughrue Mion, PLLC

(57) ABSTRACT

The invention provides an emergency power network for aircraft, for powering actuator motors (4) connected to the network, the network comprising a power bus (11) adapted to convey three-phase AC power generated by at least one DC/AC converter (12) that is powered by a DC source of the aircraft, the converter being fitted with modulator means for modulating the voltage and/or the frequency of the three-phase power generated thereby.

3 Claims, 2 Drawing Sheets

CONTROL NETWORK FOR SINGLE- OR MULTI-MOTOR ACTUATORS, THE NETWORK BEING PARTICULARLY ADAPTED TO AVIATION APPLICATIONS SUCH AS POWERING THE MOTORS OF LANDING-GEAR HOOK UNITS

The invention relates to a control network for single- or multi-motor actuators, the network being particularly adapted to aviation applications such as powering motors of landing-gear hook units.

TECHNOLOGICAL BACKGROUND OF THE INVENTION

Landing gear implementation is making ever-increasing use of electric actuators. These include actuators for operating undercarriages, wheel-bay hatches, and hook units that are all electrically actuated.

In general, hook units are fitted with two types of actuator, a main actuator and an emergency actuator for use in the event of the main actuator failing. It is important to be able to release the undercarriage retained by the locking hook, even in the event of the main actuator failing.

In configurations in which the emergency actuation is provided by an electromechanical actuator, it is appropriate to ensure that the emergency actuator can be powered. However, circumstances may arise in which the main electrical power supply networks of the aircraft are not capable of powering emergency actuators (e.g. a total failure of the engines of the aircraft). It is then appropriate to ensure that the emergency actuators can be powered, even under such circumstances.

OBJECT OF THE INVENTION

An object of the invention is to propose a power supply for this type of actuator, which power supply is both simple and lightweight.

BRIEF SUMMARY OF THE INVENTION

In order to achieve this object, for an aircraft fitted with at least one main power network delivering three-phase power for powering equipment actuators, the invention provides at least one emergency power network for aircraft, for powering actuator motors connected to the network, the network comprising a power bus adapted to convey three-phase alternating current (AC) power generated by at least one DC/AC converter that is powered by a direct current (DC) source of the aircraft, the converter being fitted with modulator means for modulating the voltage and/or the frequency of the three-phase power generated thereby.

Thus, it remains possible to power the emergency actuators with three-phase AC power and to provide some minimum level of control over their action by virtue of the modulator means, even in the event of a failure of the main power supply network of the aircraft.

Thus, for actuators that do not require accurate position control, it is nevertheless possible to control these actuators via a voltage and/or frequency profile imposed directly by the converter. The motors are thus subjected to open-loop control. Naturally, all of the motors connected to the network are controlled simultaneously, as applies for example to the motors of locking hooks.

This type of power supply is particularly suitable for powering emergency actuators that take over from failed main actuators.

The converter may be implemented very simply by means of a simple linear amplifier and it is possible to omit the heavy and bulky filter elements that are needed for the switch-mode chopper control of traditional power supply networks.

Naturally, such a configuration leads to higher levels of losses and disturbances, but that remains acceptable since such losses or disturbances occur only while using emergency actuators or motors, i.e. only very occasionally.

In practice, the DC source from which the converter generates the three-phase power may be constituted by the batteries of the aircraft, or indeed a DC source powered by the auxiliary power unit of the aircraft.

BRIEF DESCRIPTION OF THE FIGURES

The invention can be better understood in the light of the following description of the figures in the accompanying drawings, in which.

DETAILED DESCRIPTION OF THE FIGURES

Figure 1:
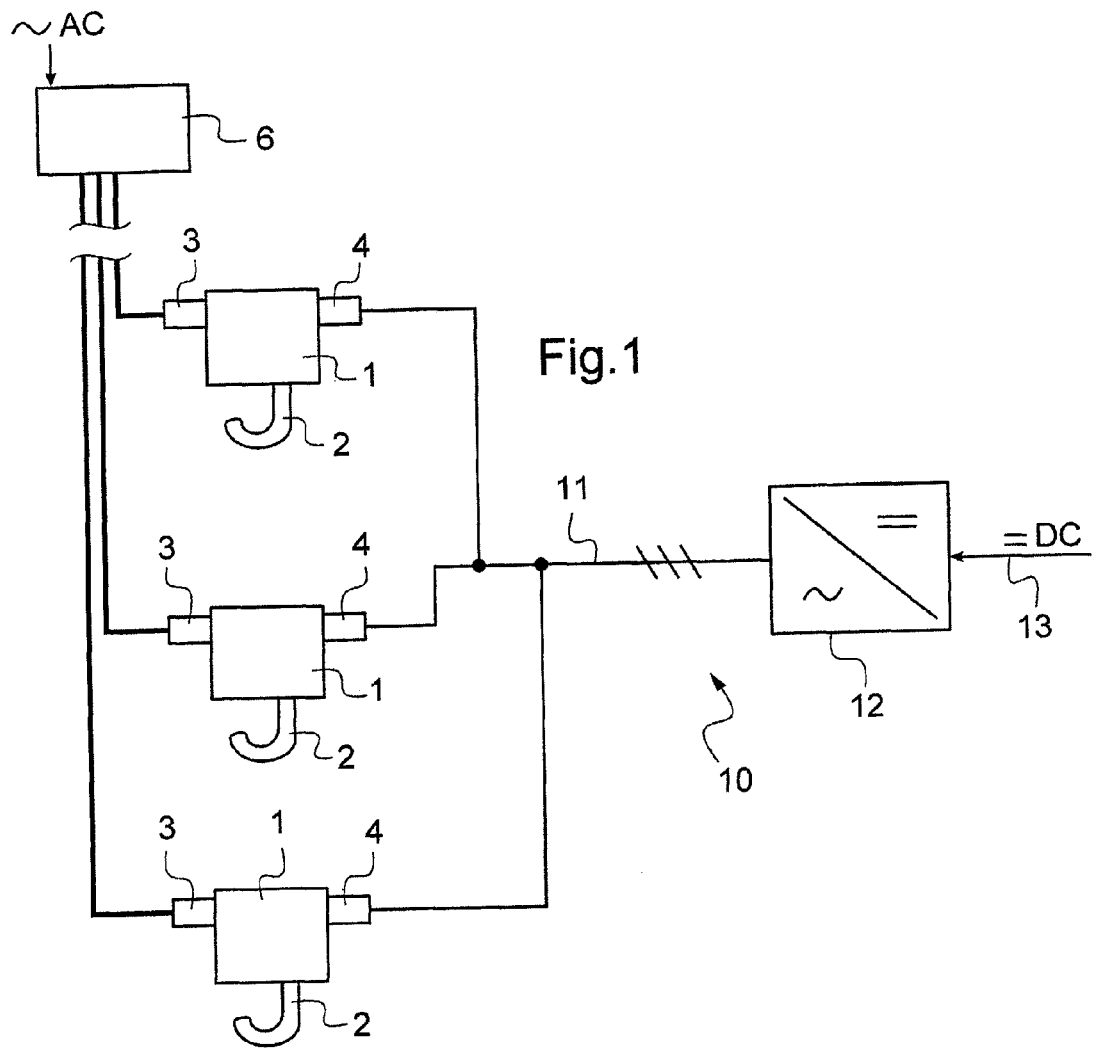
FIG. 1 is a diagram of the power supply for hook unit actuators of landing gear in a particular embodiment of the invention.

FIG. 1 is a diagram of three hook units 1 for holding two main undercarriages and the nosewheel in a raised position. In known manner, the hook units have hooks 2 that are normally open and that close on a bead forming part of the associated undercarriage when it reaches the raised position in order to hold the undercarriage in said raised position. The hook is then automatically locked by a spring mechanism.

The hook units 1 are provided with at least one main unlocking actuator 3 and with an emergency unlocking actuator 4 that enables the hook to be unlocked, and thus enables the associated undercarriage to be released in the event of the main unlocking actuator 3 failing. Here the unlocking actuators 3 and 4 are electromechanical actuators. Depending on the technology used by the hook unit, the actuators may be of the rotary type serving to cause a cam to pivot, or they may be of the linear type acting on a lever.

Here the main unlocking actuators 3 are powered by cables connected to a controller 6 for operating the landing gear. The controller contains logic serving to power the various actuators involved in controlling the undercarriages in sequence, such as the hook units, the actuators for operating the hatches, and the actuators for operating the undercarriages. For this purpose, the controller 6 is connected by at least one power supply network to a main power source of the aircraft, in practice to a generator driven by the engines of the aircraft and supplying electricity at constant voltage but varying frequency. This is well known and is summarized merely for reference.

In the invention, the emergency unlocking actuators 4 are powered by an emergency three-phase power network 10 comprising a three-phase power bus 11 that delivers an AC voltage to the emergency unlocking actuators 4, which AC is generated by a converter 12 from a DC source 13 of the aircraft. Here all of the actuators are connected to the power bus 11.

Figure 2:
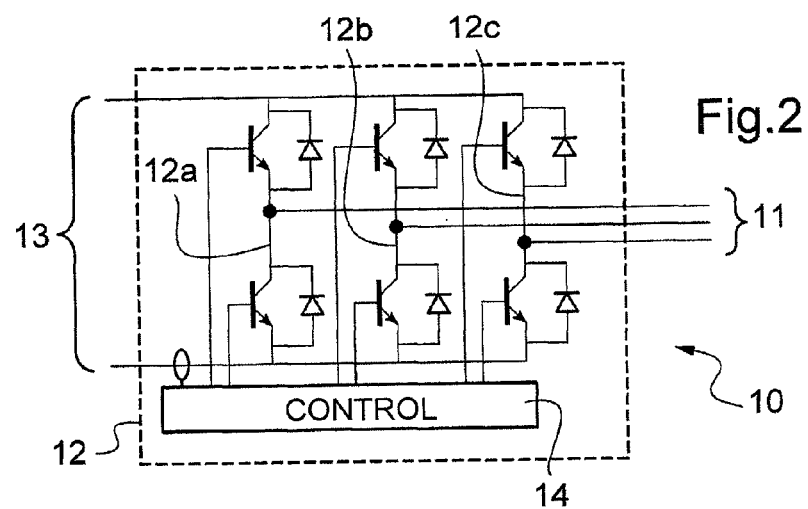
FIG. 2 is a diagram of a converter suitable for use in the emergency power network of the invention.

As can be seen in FIG. 2, in this example the converter 12 is a simple linear amplifier having three arms 12a, 12b, 12c, each having two switches controlled by a control member 14. The converter delivers three-phase power to the power bus 11 suitable for directly powering the emergency actuators 12.

The emergency power network 10 of the invention is thus particularly simple and is ideally suited for powering motors that are simple to control, not requiring any servo-control in terms of position or speed.

The control member 14 is advantageously provided with control modulator means for varying the voltage and/or frequency of the AC delivered on the power bus 11. This makes it possible to control the level of power delivered to the emergency actuators 4, thereby controlling the stroke of the actuators or the length of time taken by the actuators to unlock the units. In particular, it is advantageous to servo-control the frequency, the voltage, or the current as a function of the requirements of the actuators connected to the control network.

In the application shown here, it may be advantageous to power the emergency actuators at a fairly high level, at least at the beginning of unlocking, in order to be capable of breaking any deposit of ice that might have formed around the hook. Thereafter, when the force opposing the actuator decreases suddenly, it is advantageous to reduce the power transmitted to the emergency actuator in order to avoid pointless excess consumption of electricity. This control can be achieved using the modulator means of the converter control member 12.

Figure 3:
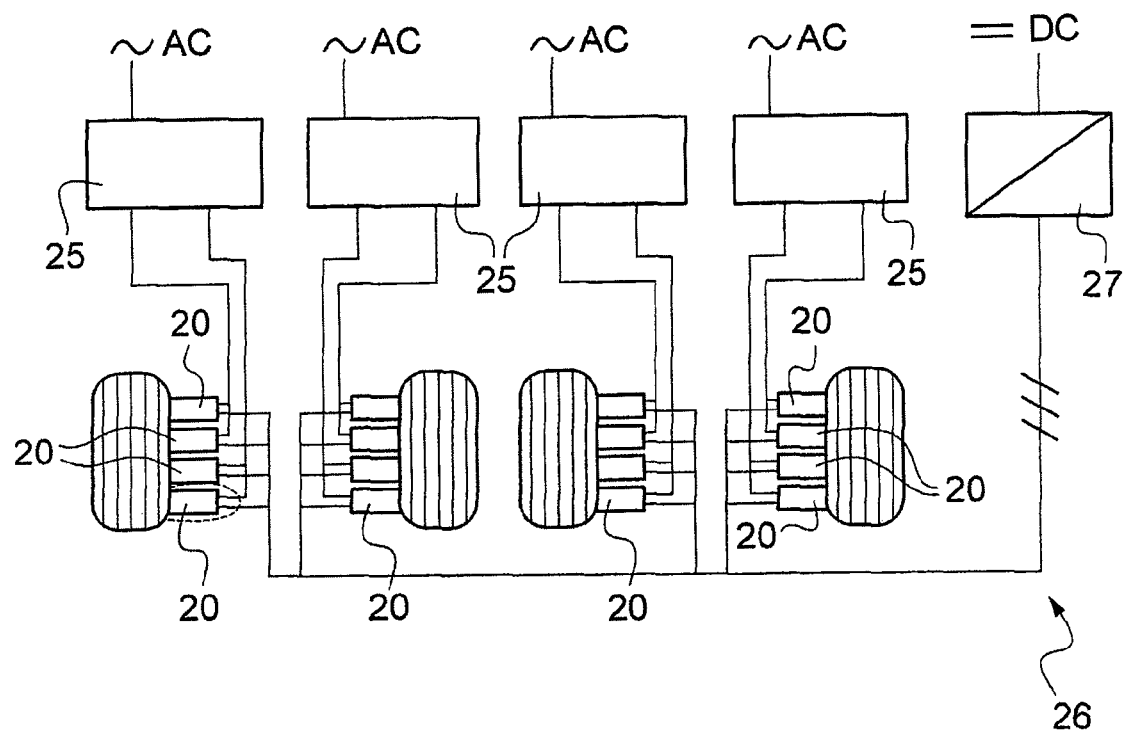
FIG. 3 is a diagram of the power supply to brake actuators fitted to electric brakes in another particular embodiment of the invention.

In a second application of the emergency power network of the invention as shown in FIG. 3, the network is used not for powering emergency actuators that are independent of main actuators, but for powering a second motor of the same main actuator, having a first motor that is powered by a main power supply network of the aircraft.

Figure 4:
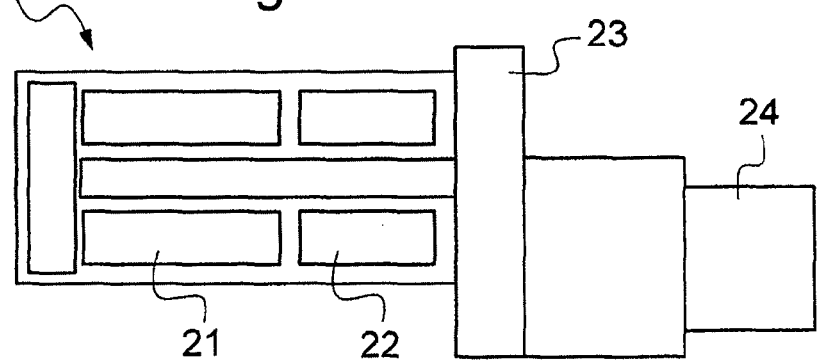
FIG. 4 is a diagram of an electromechanical brake actuator.

In this example and as shown in FIG. 4, the application relates to powering electromechanical brake actuators 20 that comprise a main motor 21 and an emergency motor 22, both mounted to drive a common shaft that engages stepdown gearing 23 driving a pusher 24 for selectively applying a braking force to brake disks.

In known manner, the main motors 21 are powered by controllers 25 that deliver power to the main motors 21, which power is calibrated as a function of braking orders delivered by a braking computer.

In this example, the emergency motors 22 are powered by an emergency power network 26 of the invention that is completely independent of the controllers 25 and that includes a three-phase power bus 28 for delivering three-phase AC power enabling the emergency motors 22 of the brake actuators 20 to be powered.

In the same manner as described above, the three-phase AC power is generated by a very simple converter 27 that converts DC power into three-phase AC power, the converter being fitted with modulator means enabling the voltage or the frequency to be modulated in order to vary in controlled manner the braking force that is applied by the actuators under drive from the emergency motors 23. Naturally, all of the emergency motors connected to the emergency power network 26 are controlled simultaneously so that all of the actuators operate simultaneously at the same power.

Numerous variants could naturally be applied without going beyond the ambit of the invention. For example, the actuators connected to the emergency power network of the invention may be connected in series rather than in parallel. It is also possible to use other technologies in order to implement the converter, e.g. a multi-lever inverter (MLI) or indeed full-wave inverter. It is appropriate to use technology that is simple, even if such technology is likely to give rise to losses or disturbances. Such losses and disturbances remain acceptable insofar as the actuators powered operate only occasionally and for periods of operation that are short (typically a few seconds).

It should also be observed that in both embodiments described (duplicating actuators or duplicating motors within a given actuator), complete segregation is ensured between the power supply for the main motors or actuators and the power supply for the emergency motors or actuators. Thus, there is no risk of the power delivered by the emergency power network polluting the main power network. This makes it possible to omit filter components that are heavy and bulky, thereby further simplifying the implementation of the converter.

What is claimed is:

1. An electrical power supply network for powering equipment actuators in an aircraft, the electrical power supply network comprising:
   a main power network for powering main actuator motors, and
   an emergency power network for powering emergency actuator motors,
   wherein, there is a complete electrical isolation between the main power network and the emergency power network, and
   wherein the emergency power network comprises:
      a DC source of the aircraft;
      at least one DC/AC converter that is powered by the DC source of the aircraft and which generates three-phase power in response to receiving power from the DC source, the at least one DC/AC converter comprising modulator means for modulating at least one of voltage and frequency of the generated three-phase power; and
      a power bus adapted to convey the three-phase AC power generated by the at least one DC/AC converter to the emergency actuator motors.

2. An emergency power network according to claim 1, wherein the converter includes a linear amplifier.

3. An electrical power supply network for powering equipment actuators in an aircraft, the electrical power supply network comprising:
   a main power network for powering main actuator motors, and
   an emergency power network for powering emergency actuator motors,
   wherein, there is a complete electrical isolation between the main power network and the emergency power network, and
   wherein the emergency power network comprises:
      a DC source of the aircraft;
      at least one DC/AC converter that is powered by the DC source of the aircraft and which generates three-phase power in response to receiving power from the DC source, the at least one DC/AC converter comprising a modulator configured to modulate at least one of voltage and frequency of the generated three-phase power; and
      a power bus adapted to convey the three-phase AC power generated by the at least one DC/AC converter to the emergency actuator motors.

* * * * *